United States Patent [19]
Brown et al.

[11] 3,835,834
[45] Sept. 17, 1974

[54] CULTURE TRANSPORTER

[76] Inventors: James B. Brown, 1 Seneca Pl., Greenwich, Conn. 06830; James D. Bailey, 2107 N. Edward, Decatur, Ill. 62526

[22] Filed: Feb. 24, 1972

[21] Appl. No.: 229,007

[52] U.S. Cl............ 128/2 W, 128/269, 206/63.2 R
[51] Int. Cl............................................ A61b 10/00
[58] Field of Search.................. 128/2 W, 269, 270; 206/63.2 R, 63.2 A, 56 AA, 165, 46 SG, 46 ST, 78 B, DIG. 29; 128/2 R, 2 B; 222/541, 94, 107; 221/302

[56] References Cited
UNITED STATES PATENTS

| | | | |
|---|---|---|---|
| 2,917,631 | 12/1959 | Hyzer | 206/47 A |
| 3,035,691 | 5/1962 | Rasmussen | 206/63.2 R |
| 3,083,821 | 4/1963 | Woodson | 206/78 B |
| 3,163,160 | 12/1964 | Cohen | 206/63.2 R |
| 3,450,129 | 6/1969 | Avery | 128/2 W |
| 3,537,605 | 11/1970 | Solowey | 128/218 M |

*Primary Examiner*—Richard A. Gaudet
*Assistant Examiner*—Henry J. Recla
*Attorney, Agent, or Firm*—Hofgren, Wegner, Allen, Stellman and McCord

[57] ABSTRACT

A culture transporter having a pair of recesses formed in a body member to receive respectively, a culture medium and a culture swab with a closing strip secured to the body member to seal off the recesses one from the other for a completely sterile package with provision for removal and use of the culture swab in collecting a culture and return of the culture swab to the culture transporter with resealing thereof. A fracturable seal between said recesses permits flow of the culture medium to the tip of the swab to maintain the swab moist and the culture in a live condition until laboratory tests are performed on the culture. The body member and closing strip both have a generally planar configuration with the closing strip having an exposed flat face which may bear desired indicia. A tubular member of absorbent material is located at an end of the culture swab recess adjacent the culture medium recess to surround the culture swab tip whereby upon fracture of the seal between said recesses, the culture medium may flow to the tubular member which retains the culture medium and assists in retaining the culture swab tip in a moist condition.

10 Claims, 5 Drawing Figures

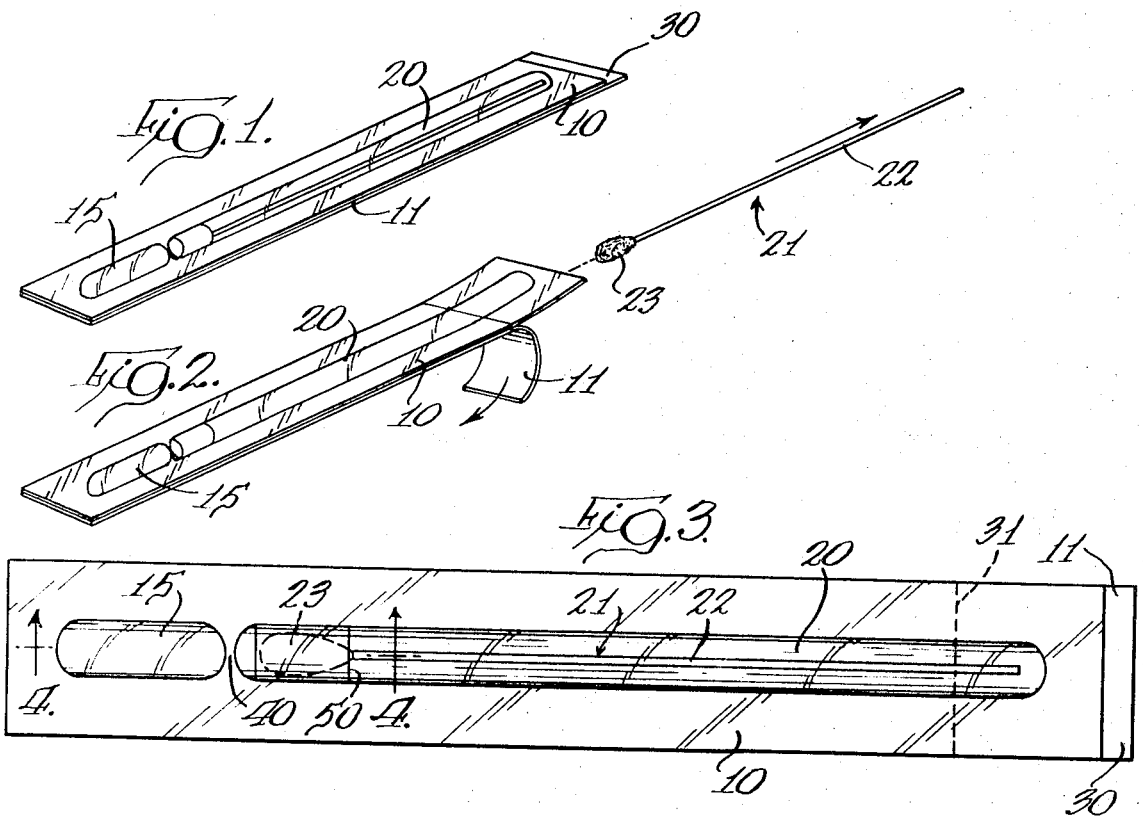

CULTURE TRANSPORTER

BACKGROUND OF THE INVENTION

This invention pertains to the field of culture transporters and other types of disposable swab and culture medium devices. A culture transporter is manufactured and shipped in a sterile condition with the desired culture medium and a culture swab contained within the culture transporter and whereby, after taking of the culture, the unit may be resealed with the culture maintained in a live condition by moistening thereof with the culture medium until laboratory tests have been performed followed by throw away of the culture transporter.

Many different swabbing units used by physicians and technicians for collecting a culture are known. Those units now on the market generally involve the use of an ampoule of glass encapsulating the culture medium and fracturable when the culture medium is to be used to retain the swab tip moist. Such devices require the use of a plug of cotton or the like, which permits flow of some culture medium therethrough but prevents the travel of glass particles from the fractured ampoule to the tip of the culture swab. Such structures cannot be used with certain culture mediums which will not penetrate the plug of cotton or other material and additionally, the structures have added manufacturing cost because of the design thereof including the use of the ampoule.

Examples of prior art disposable swab devices are shown in U.S. Pat. Nos. 3,163,160 and 3,450,129.

In the invention disclosed herein, the shortcomings of the prior art devices both as to cost and operability are overcome. A body member is formed with recess means for holding both a culture medium and a culture swab in spaced relation to each other and a closing strip seals the recess means to contain the culture medium without the use of a separate ampoule. A fracturable connection separates the culture medium from the culture swab and can be manually fractured by pressure to permit flow of the culture medium to the culture swab tip without any obstruction to flow as previously caused by a plug of cotton or the like. Additionally, the culture transporter of this invention has the body member and closing strip of generally planar form whereby an exposed face of the closing strip can bear desired indicia including information as to the type of culture medium contained therein as well as identification of the patient and such instructions as may be required in use of the culture transporter.

SUMMARY OF THE INVENTION

The general object of this invention is to provide a new and improved culture transporter which has culture medium and a culture swab carried therein and which permits removal and reinsertion of the culture swab followed by moistening thereof by the culture medium by release of the culture medium for flow to the tip of the culture swab without any obstruction to flow and without any fracturing of a glass ampoule with the culture transporter being easily manufactured at minimum expense.

Another object of the invention is to provide a culture transporter having two primary components for enclosing a culture medium and a culture swab with a planar exposed face for carrying suitable indicia thereon without requiring an enclosing envelope and with the two elements embodying a base member formed with recesses for housing the culture medium and the culture swab and a closing strip secured to the base member to close off the recesses and form with a narrow base section of the base member a seal between the recesses which may be fractured easily to permit flow of culture medium to the tip of the culture swab, and with an absorbent tubular member positioned in the recess for the culture swab to surround the tip of the swab and retain the culture medium to retain the culture swab tip in a moist condition until the culture reaches the laboratory.

BRIEF DESCRIPTION OF THE DRAWING

FIG. 1 is a perspective view of the culture transporter;

FIG. 2 is a view similar to FIG. 1 showing the culture transporter opened and with the culture swab in a removed position;

FIG. 3 is a plan view of the culture transporter on an enlarged scale;

FIG. 4 is a vertical section taken generally along the line 4—4 in FIG. 3 and on a further enlarged scale; and FIG. 5 is a vertical transverse section taken generally along the line 5—5 in FIG. 4.

DESCRIPTION OF THE PREFERRED EMBODIMENT

The culture transporter has two primary elements which are assembled together to form a sealed package with the first of these primary elements being a base member 10 of fairly rigid material. As an example, such a material may be a polyvinylchloride material of 10 mil thickness which can be formed with recess means. The other primary element is a closing strip 11 which may be of a suitable material such as waterproof paper which is adhesively secured to the base member 10 to complete the package.

The base member 10 is generally planar and is formed in a mold with recess means including a recess 15 for receiving a culture medium 16 in the form of a liquid or cream and a second recess 20 of sufficient length to receive a culture swab indicated generally at 21 and having a handle 22 with a tip 23 of cotton, rayon or other material for collection of a culture to be tested. The base member 10 and closing strip 11 are adhesively secured together by use of a suitable adhesive such as an FDA approved Permacel adhesive which permits peeling of the closing strip 11 away from the relatively rigid base member 10, as shown in FIG. 2. The closing strip has a tab end 30 free of adhesive whereby the tab end may be manually engaged to peel the closing strip 11 away from the base member 10 a short distance until a peel line 31 identified by suitable marking is reached. Each of the primary elements are generally planar whereby a substantial area of adhesive bonding to each other is obtained as will be apparent in the plan view of FIG. 3.

A certain area of the closing strip 11 is not coated with adhesive or if the strip is fully coated, then a release agent such as a silicone material or other material is applied thereto. This is the area which overlies the major length of the recess 20 in the base member 10 whereby the culture swab 21 and particularly the tip 23 thereof will not contact any adhesive surface to prevent free removal and reinsertion of the culture swab relative to the culture transporter.

There is a narrow area of adhesive bonding between the base member 10 and the closing strip 11 between the recesses 15 and 20 which defines a separation therebetween and which forms a fracturable fluid seal for the culture medium until it is to be used. As shown in FIGS. 3 and 4, a narrow base section 40 of the base member 10 extends transversely of the recesses 15 and 20 and is adhesively secured to the closing strip 11. When the culture medium 16 is to be released for flow to the tip 23 of the culture swab, manual pressure against the base member in the area overlying the narrow base section 40 fractures the adhesive bond between the base member and the closing strip 11 to open a flow passage. This area of bond must be sufficiently large to avoid fracture during shipment of the culture transporter but not too large to prevent fracture by manual pressure. A width of the narrow base section 40 between the recesses 15 and 20 and at the narrowest point, as viewed in FIG. 3, should be approximately one-eighth inch.

In order to maintain the culture swab tip 23 moist and a culture carried thereon in a live condition, a tubular member 50 of a highly absorbent cellulose fiber material and with sufficient rigidity to retain its form is positioned at an end of the culture swab recess 20 adjacent the culture medium recess 15. An example of suitable material would be a relatively thick tea bag material. This tubular member 50 is retained in position during both removal and reinsertion of the culture swab 21 by having a portion of the exterior surface thereof adhesively bonded to the closing strip 11 as indicated at 51 in FIG. 5. This tubular member will soak up culture medium either in the form of a liquid or a cream and will retain the culture and culture swab tip in moist condition for a prescribed number of days.

In manufacture, the base member 10 is formed with the recesses and with the recesses 15 and 20 opening upwardly the culture medium is supplied by needle or suitable means into the recess 15 and the culture swab 21 placed in the recess 20. The closing strip 11 is then secured to the base member 10 to complete the package and it is then sterilized. The exposed face of the closing strip 11 being a planar surface can be pre-printed with suitable indicia indicating the culture medium and with instructions for use as well as providing space for insertion of the patient's name and other pertinent data. This avoids the need for any separate transporting envelope or other container or label for recording data.

In use, the tab end 30 is manually engaged to peel back the closing strip 11 to the position shown in FIG. 2 where the culture swab 21 is removed and used. The culture swab is then reinserted in the recess 20 and the closing strip 11 brought back to the position shown in FIG. 1. The culture transporter is then again fully sealed and manual pressure exerted over the narrow base section 40 fractures the bond thereof to the closing strip 11 and with tilt of the culture transporter the culture medium 16 can flow between the narrow base section 40 and the closing strip 11 to the area of the culture swab tip 23 and the tubular member 50. This maintains the swab and culture moist and the culture in live condition. The structure disclosed herein permits free flow of the culture medium, whether liquid or cream, to the point of application to the swab and without concern as to glass particles or other foreign material which are problems with some existing units.

What we claim is:

1. A culture transporter comprising, a culture swab with absorbent material, a culture medium, a planar base formed with recess means holding said culture swab and culture medium in spaced-apart relation to each other, with the culture medium released by pressure, a planar closing strip of flexible material removably adhesively secured to said planar base to close off said recess means and peelable from the planar base to permit removal and return of the culture swab, and a tubular member of absorbent material positioned in said recess means surrounding the absorbent material on a tip of the culture swab to retain the culture medium in association therewith after pressure release of the culture medium.

2. A culture transporter as defined in claim 1 wherein said recess means is separated by a contacting part of the planar base and planar closing strip to separate the culture medium from the culture swab and said contacting part being separable by manual pressure to permit flow of culture medium to the culture swab.

3. A culture transporter comprising a rigid formed base with a pair of spaced apart recesses separated by a narrow base section, a culture swab in one of said recesses, a culture medium in the other recess, a flexible closing strip adhesively secured to said formed base including said narrow base section to cover said recesses and seal the culture medium recess from the swab recess, whereby the closing strip can be peeled from the base a distance sufficient to permit removal and reinsertion of the swab without disturbing the culture medium, followed by resealing the closing strip to the base and breaking of the adhesion of the closing strip to the narrow base section to permit the culture medium to reach the reinserted swab.

4. A culture transporter as defined in claim 3 wherein said base is generally planar except for said recesses and said closing strip is also planar to provide a flat exposed surface to carry desired indicia.

5. A culture transporter as defined in claim 3 wherein said recess holding the culture swab is approximately semi-circular in cross section and only slightly larger than the diameter of the culture swab whereby entry of ambient air into said last-mentioned recess during removal and reinsertion of the culture swab relative thereto is minimized.

6. A culture transporter as defined in claim 3 wherein a tube of absorbent material is positioned in the recess for the culture swab adjacent said narrow base section to provide a dam for culture medium when said adhesion is broken and to surround the tip of the culture swab and retain it in moist condition.

7. A culture transporter as defined in claim 6 wherein the culture medium, prior to use, is retained in its recess solely by sealing contact between said formed base and said flexible closing strip.

8. A culture transporter comprising a base of relatively rigid material formed with a first recess and a second recess, a culture medium in the first recess, a culture swab in the second recess, said recesses being separated by a narrow base section, a closing strip of flexible material attached to said base and the narrow base section to seal off said recesses, said transporter including provision for removal of a culture swab from the second recess and return of the culture swab thereto after use without disrupting the attachment of the flexible material to the narrow base section, and said attachment being rupturable by manual pressure to permit flow of culture medium to the tip of the culture swab.

9. A culture transporter comprising, a culture swab, a culture medium, a planar base of relatively rigid material formed with recess means holding said culture swab and culture medium in spaced noncommunicating relation to each other, a planar closing strip of flexible material removably adhesively secured to said planar base to close off said recess means and to permit peel back of sufficient of said closing strip from the planar base to permit removal of the culture swab and return thereof to the recess means and closing of said recess means by the closing strip, and a tubular member of absorbent material surrounding the absorbent material on the tip of the culture swab to retain the culture medium after use of the swab.

10. A culture transporter as defined in claim 9 wherein said recess means is separated by contacting parts of the planar base and planar closing strip to separate the culture medium from the culture swab and said contacting parts being separable by manual pressure to permit flow of culture medium to the culture swab.

* * * * *